(12) United States Patent
Paul

(10) Patent No.: US 12,066,667 B2
(45) Date of Patent: Aug. 20, 2024

(54) PULL PROOF FIBER OPTIC CONNECTOR SYSTEM

(71) Applicant: CommScope Technologies LLC, Hickory, NC (US)

(72) Inventor: Randall Bobby Paul, Elizabethville, PA (US)

(73) Assignee: COMMSCOPE TECHNOLOGIES LLC, Hickory, NC (US)

(*) Notice: Subject to any disclaimer, the term of this patent is extended or adjusted under 35 U.S.C. 154(b) by 23 days.

(21) Appl. No.: 17/687,880

(22) Filed: Mar. 7, 2022

(65) Prior Publication Data

US 2022/0283383 A1 Sep. 8, 2022

Related U.S. Application Data

(60) Provisional application No. 63/157,397, filed on Mar. 5, 2021.

(51) Int. Cl.
G02B 6/38 (2006.01)
(52) U.S. Cl.
CPC ......... *G02B 6/3825* (2013.01); *G02B 6/3831* (2013.01); *G02B 6/3861* (2013.01)
(58) Field of Classification Search
CPC ...................................................... G02B 6/38
USPC .......................................................... 385/60
See application file for complete search history.

(56) References Cited

U.S. PATENT DOCUMENTS

| | | | |
|---|---|---|---|
| 5,432,879 A | 7/1995 | Lee | |
| 10,241,281 B2 | 3/2019 | Otomitsu | |
| 10,545,299 B2* | 1/2020 | Takeuchi | H01R 13/6683 |
| 11,143,826 B1* | 10/2021 | Wong | G02B 6/3897 |
| 11,262,520 B2* | 3/2022 | Geens | G02B 6/4444 |
| 11,726,269 B2* | 8/2023 | Wong | G02B 6/3894 |
| | | | 385/78 |
| 2019/0041584 A1* | 2/2019 | Coenegracht | G02B 6/3825 |
| 2019/0041587 A1* | 2/2019 | Waldron | G02B 6/3849 |
| 2020/0057224 A1* | 2/2020 | Dannoux | G02B 6/3825 |
| 2020/0284998 A1* | 9/2020 | Higley | G02B 6/3812 |
| 2020/0310041 A1* | 10/2020 | Chang | G02B 6/3893 |
| 2020/0341208 A1* | 10/2020 | Verheyden | G02B 6/3849 |
| 2021/0011235 A1* | 1/2021 | Wimmer | G02B 6/3895 |
| 2021/0132300 A1* | 5/2021 | Isenhour | G02B 6/3875 |
| 2021/0263231 A1* | 8/2021 | Fujita | G02B 6/3893 |
| 2021/0311262 A1* | 10/2021 | Verheyden | G02B 6/3849 |
| 2022/0163730 A1* | 5/2022 | Verheyden | G02B 6/3809 |
| 2023/0089214 A1* | 3/2023 | Verheyden | G02B 6/3825 |

\* cited by examiner

*Primary Examiner* — Kaveh C Kianni
(74) *Attorney, Agent, or Firm* — Merchant & Gould P.C.

(57) ABSTRACT

The present disclosure relates generally to a fiber optic connector system. The fiber optic connector system includes two fiber optic connectors that each have a ferrule assembly mated together within a fiber optic adapter. The fiber optic connector system includes end faces of the ferrule assemblies that remain in a contacted state when an axial load is applied to an optical fiber of one of the two fiber optic connectors. As such, an optical connection remains between the two fiber optic connectors even when one connector is retracted from the other connector.

4 Claims, 10 Drawing Sheets

PULL PROOF FIBER OPTIC CONNECTOR SYSTEM

TECHNICAL FIELD

The present disclosure relates generally to optical fiber communication systems. More particularly, the present disclosure relates to fiber optic connectors used in optical fiber communication systems.

BACKGROUND

Fiber optic communication systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. A spring is used to bias the ferrule assembly in a distal direction relative to the connector housing. The ferrule functions to support an end portion of at least one optical fiber (in the case of a multi-fiber ferrule, the ends of multiple fibers are supported). The ferrule has a distal end face at which a polished end of the optical fiber is located. When two fiber optic connectors are interconnected, the distal end faces of the ferrules abut one another, and the ferrules are forced proximally relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the ferrules. For many fiber optic connector styles, alignment between two fiber optic connectors is provided through the use of an intermediate fiber optic adapter.

If one of the cables of one of the two connectors within the fiber optic adapter is pulled away from the other one of the two connectors or otherwise placed under tension, the end faces of the ferrules of the two connectors can disengage causing an optical disconnection or degradation in signal transmission.

It is desirable to have a fiber optic connector system in which the fibers are not subject to disconnection when an axial load is applied to one of the fiber optic connectors positioned within the fiber optic adapter.

SUMMARY

The present disclosure relates generally to a fiber optic connector system and method. The fiber optic connector system includes two fiber optic connectors that each have a ferrule assembly mated together within a fiber optic adapter. The fiber optic connector system further includes endfaces of the ferrule assemblies that remain in a contacted state when an axial load is applied to an optical fiber of one of the two fiber optic connectors. As such, an optical connection remains between the two fiber optic connectors even when one connector is retracted from the other connector.

These and other features and advantages will be apparent from a reading of the following detailed description and a review of the associated drawings. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
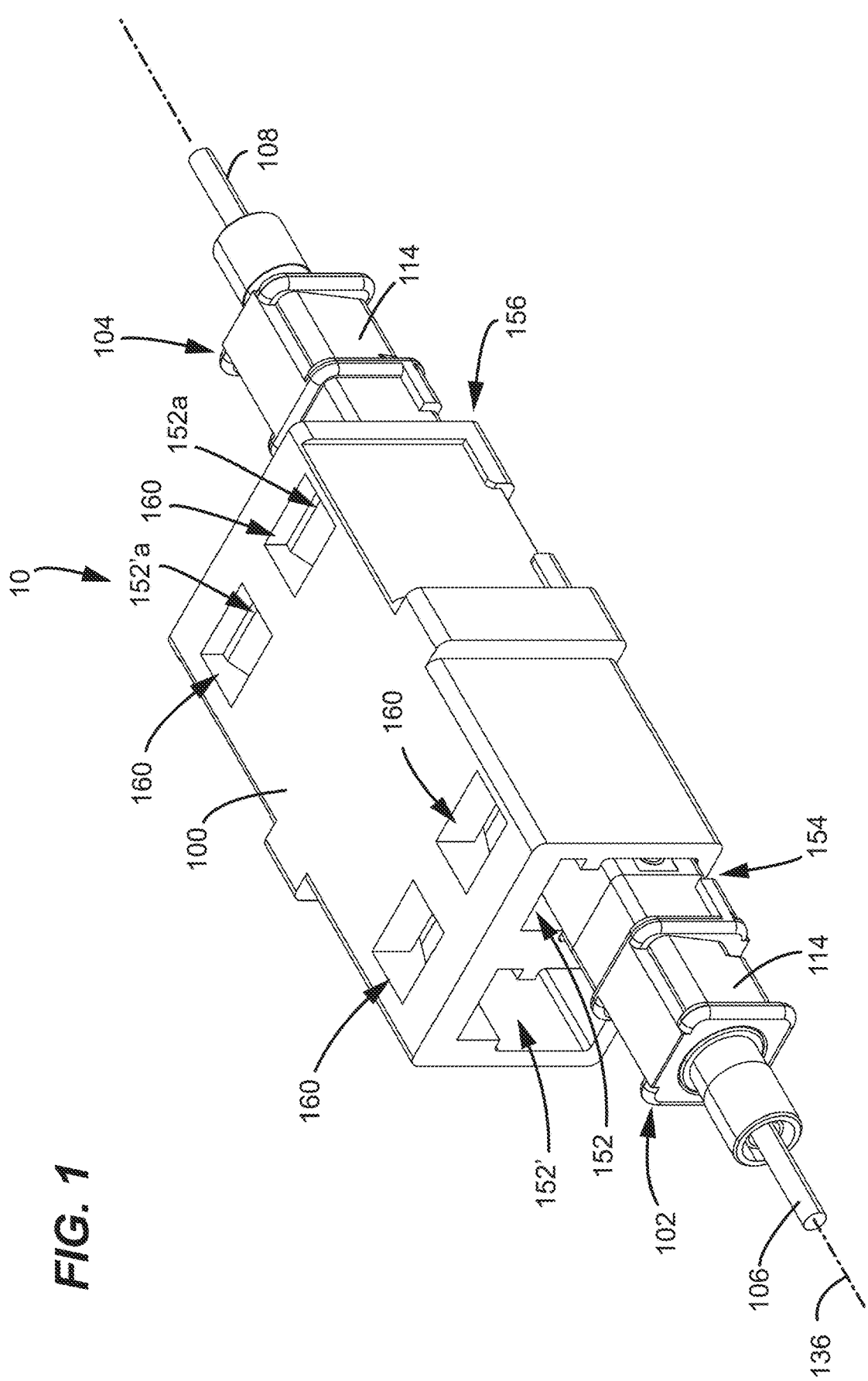
FIG. 1 illustrates a perspective view of a fiber optic connector system including a LC duplex adapter containing a pair of optically coupled first and second fiber optic connectors in accordance with the principles of the present disclosure.
Figure 2:
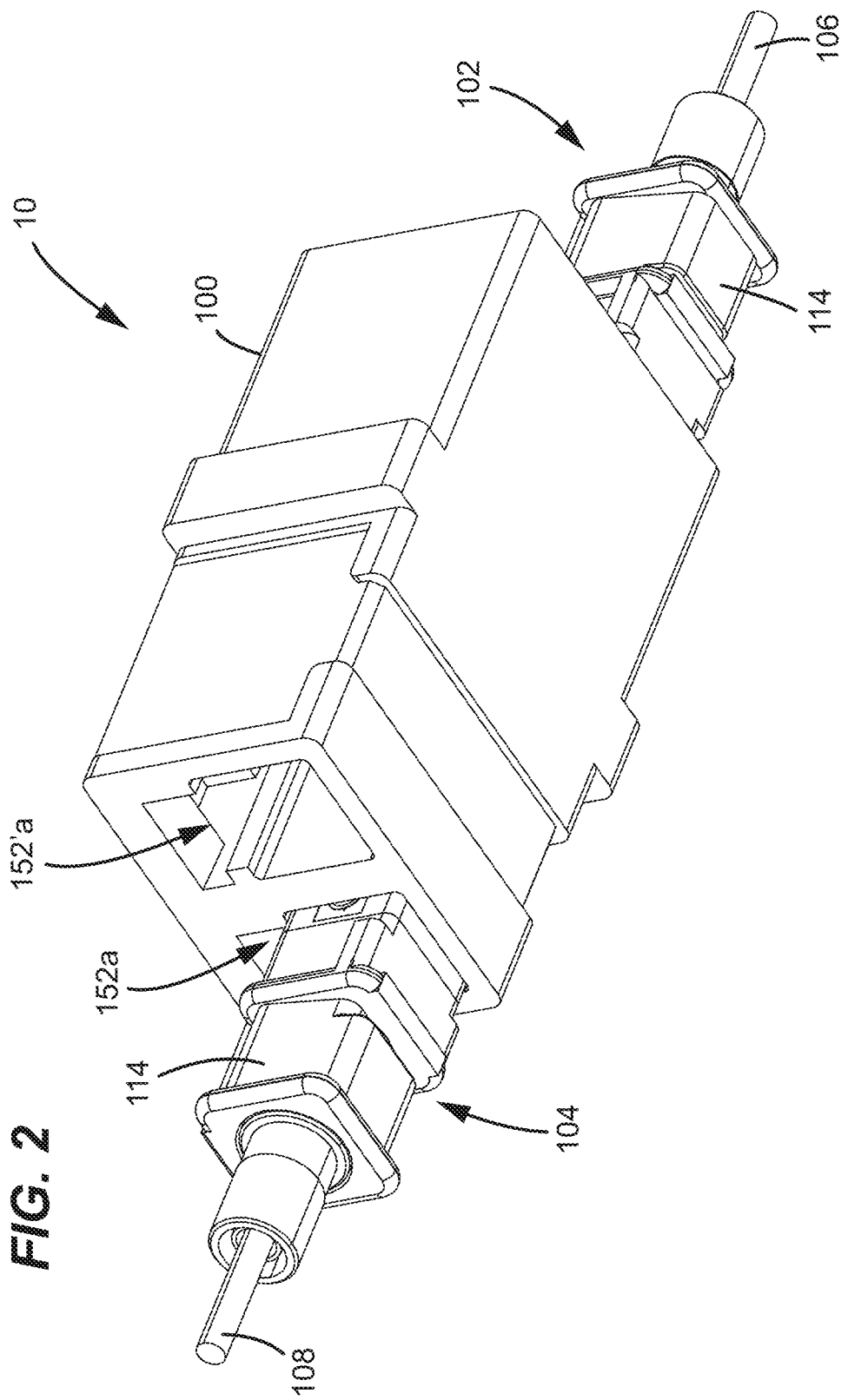
FIG. 2 illustrates an opposite end view of the fiber optic connector system of FIG. 1.

FIGS. 1-2 depict a fiber optic connector system 10 that includes a fiber optic adapter 100 containing a pair of optically coupled first and second fiber optic connectors 102, 104. The fiber optic adapter 100 shown is a LC duplex adapter, although alternatives are possible. The first and second fiber optic connectors 102, 104 can be configured to terminate separate first and second cables 106, 108 having respective first and second optical fibers 110, 112 (see FIG. 4) desired to be optically coupled together. The first and second fiber optic connectors 102, 104 can be single-fiber optical connectors or multi-fiber optical connectors. The first and second fiber optic connectors 102, 104 depicted are configured as LC connectors and are configured to be used in fiber optic equipment that have a standard LC footprint.

Other example fiber optic connectors can include SC connectors, FC connectors, FT connectors, ST connectors, and MPO/MTP connectors.

The first and second fiber optic connectors 102, 104 each includes a connector body 114 (e.g., housing) that respectively encloses the first and second optical fibers 110, 112 of the first cable 106. The fiber optic adapter 100 can include an alignment device 116 for co-axially aligning the first and second optical fibers 110, 112 corresponding to the first and second fiber optic connectors 102, 104 to provide an optical coupling therebetween. The alignment device 116 is centrally located within the fiber optic adapter 100 and receives and coaxially aligns the first and second optical fibers 110, 112 of the first and second fiber optic connectors 102, 104. The duplex adapter 100 is configured to couple two connectors in a side-by-side orientation.

Figure 3:
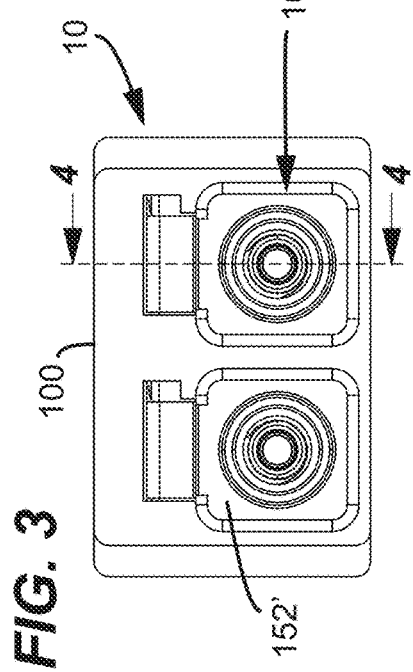
FIG. 3 illustrates an end view of the fiber optic connector system of FIG. 1.
Figure 4:
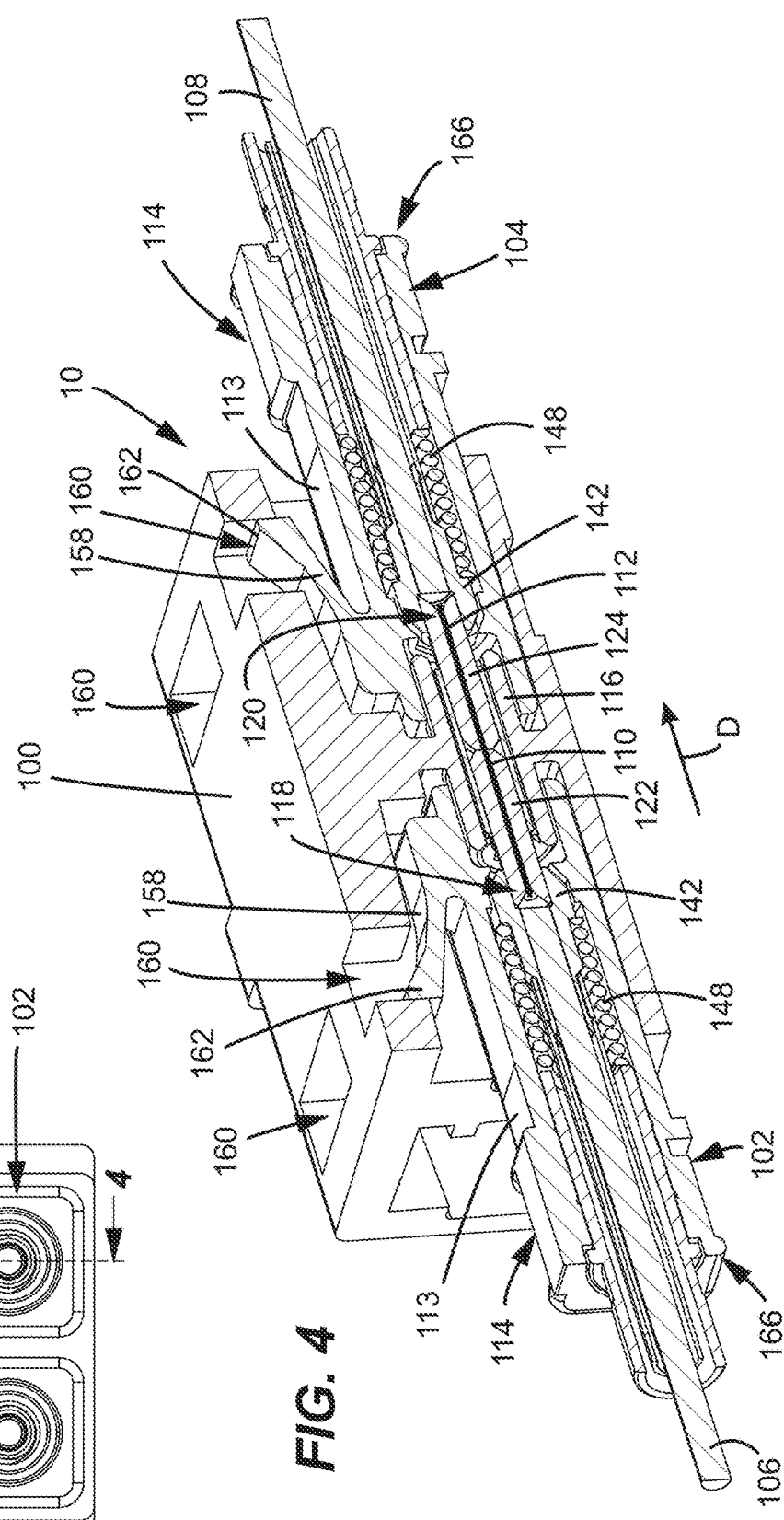
FIG. 4 illustrates a cross-sectional view taken along line 4-4 of FIG. 3.

Referring to FIGS. 3-4, the first and second fiber optic connectors 102, 104 each include a ferrule assembly 118, 120. The ferrule assemblies 118, 120 each include a ferrule 122, 124. The first and second optical fibers 110, 112 are respectively secured to the ferrules 122, 124 of the ferrule assemblies 118, 120. In one example, the ferrules 122, 124 are generally cylindrical. In one example, the ferrules 122, 124 have a diameter in the range of 1-3 millimeters or in the range of 1.25-2.5 millimeters. The ferrules 122, 124 are of identical construction so that only one need be described in detail.

Figure 5:
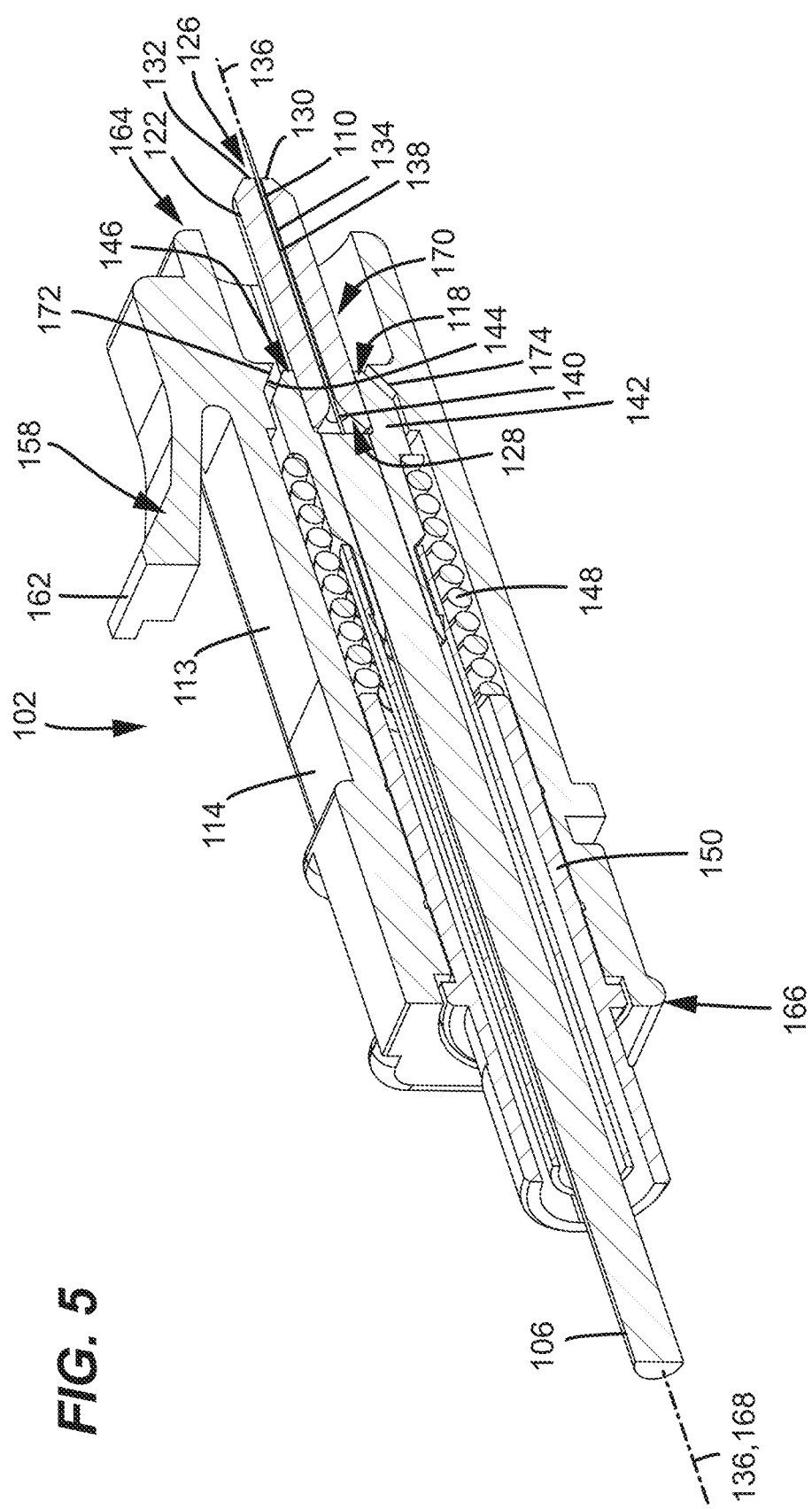
FIG. 5 illustrates a cross-sectional view of one of the fiber optic connectors of FIG. 1.

Turning to FIG. 5, the ferrule 122 includes a distal end 126 positioned opposite from a proximal end 128. The distal end 126 of the ferrule 122 defines a front endface 130 at which an interface end 132 of the optical fiber 110 is located. The ferrule 122 defines a fiber passage 134 that is concentric with a central axis 136 of the ferrule 122. The fiber passage 134 can extend through the ferrule 122 from the proximal end 128 to the distal end 126.

The optical fiber 110 includes a first portion 138 secured within the fiber passage 134 and a second portion 140 that extends rearwardly from the proximal end 128 of the ferrule 122. The first portion 138 of the optical fiber 110 is preferably secured by an adhesive (e.g., epoxy) within the fiber passage 134 of the ferrule 122. That is, the fiber passage 134 at the distal end 126 of the ferrule 122 can receive injected adhesive in order to pot the optical fiber 110 within the fiber passage 134. The interface end 132 preferably includes a processed end face accessible at the distal end 126 of the ferrule 122. In certain examples, the first and second fiber optic connectors 102, 104 can include a boot that has a distal end portion coupled to a rear end 166 of the connector bodies 114, respectively.

The ferrule 122 is preferably constructed of a relatively hard material capable of protecting and supporting the first portion 138 of the optical fiber 110. In one embodiment, the ferrule 122 has a ceramic construction. In other embodiments, the ferrule 122 can be made of alternative materials such as Ultem, thermoplastic materials such as Polyphenylene sulfide (PPS), other engineering plastics or various metals.

In one example, the ferrule 122 can be a single fiber ferrule such as a ferrule for an SC connector, and ST connector, or an LC connector. While a single fiber ferrule is depicted, aspects of the present disclosure are also applicable to multi-fiber ferrules such as MT-ferrules and MPO ferrules. A typical multi-fiber ferrule can have a generally rectangular shape and can support a plurality of optical fibers supported in one or more rows by the multi-fiber ferrule.

The ferrule assembly 118 also includes a hub 142 that has a chamfered section 144 that seats within the connector body 114. The proximal end 128 of the ferrule 122 can be mounted to a front end 146 of the hub 142.

The ferrule assembly 118 also includes a spring 148 (e.g., biasing member). The spring 148 can provide a biasing force that biases the ferrule 122 and the hub 142 in a forward direction D along the central axis 136. The spring 148 can be retained within the connector body 114 by a rear housing 150. In certain examples, the spring 148 is a coil-shaped spring.

In FIG. 5, the ferrule 122 and hub 142 are shown moved rearwardly against the spring, representing a typical location when the first fiber optic connector 102 is axially aligned and mated with a second fiber optic connector 104, as shown in FIGS. 1-4, for signal transmission.

Turning again to FIGS. 1-2, the fiber optic adapter 100 includes first and second adapter port pairs 152, 152a and 152', 152a'. The first and second fiber optic connectors 102, 104 can be inserted within opposing adapter ports 152, 152a of the duplex adapter 100 to be optically coupled. The fiber optic adapter 100 has a first axial end portion 154 that defines the first adapter port 152 for holding the first fiber optic connector 102. The fiber optic adapter 100 also includes a second axial end portion 156 that defines the second adapter port 152a for holding the second fiber optic connector 104 in alignment with the first fiber optic connector 102 along the central axis 136 in a connected state.

The fiber optic connector system 10 can include a latching arrangement for securing the first and second fiber optic connectors 102, 104 respectively in the first and second adapter ports 152, 152a of the fiber optic adapter 100. For example, the connector body 114 of the first and second fiber optic connectors 102, 104 can include an integrally-molded latch 158 (e.g., trigger, see FIG. 5) that extends at an acute angle with respect to a top wall 113 of the connector body 114. The fiber optic adapter 100 also defines recesses 160 that are shaped and sized to admit entrance of a locking tab portion 162 of the latches 158 when the first and second connectors 102, 104 are slidingly disposed into the respective ports 152, 152a. It is noted that the recesses 160 will be located on the same side, i.e., the top side 113, of the fiber optic adapter 100.

When the locking tab portions 162 become aligned with the recesses 160, the locking tab portions 162 can snap into the recesses 160 such that the first and second connectors 102, 104 cannot be inadvertently withdrawn. That is, when the first and second fiber optic connectors 102, 104 are fully seated within the fiber optic adapter 100, the locking tab portions 162 of the latches 158 will snap into the recesses 160 of the fiber optic adapter 100 to secure the first and second fiber optic connectors 102, 104 within the fiber optic adapter 100. To remove the first and second fiber optic connectors 102, 104, a user must depress the locking tab portions 162 of the latches 158 by pressing a latching handle so that the locking tab portions 162 are moved downwardly toward the connector body 114, thereby removing the locking tab portions 162 from the respective recesses 160 and permitting withdrawal.

Figure 6:
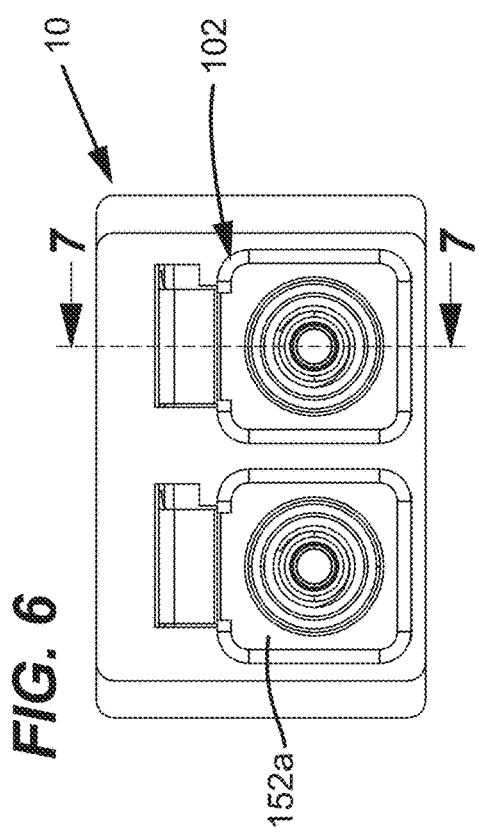
FIG. 6 illustrates an end view of the fiber optic connector system of FIG. 1.
Figure 7:
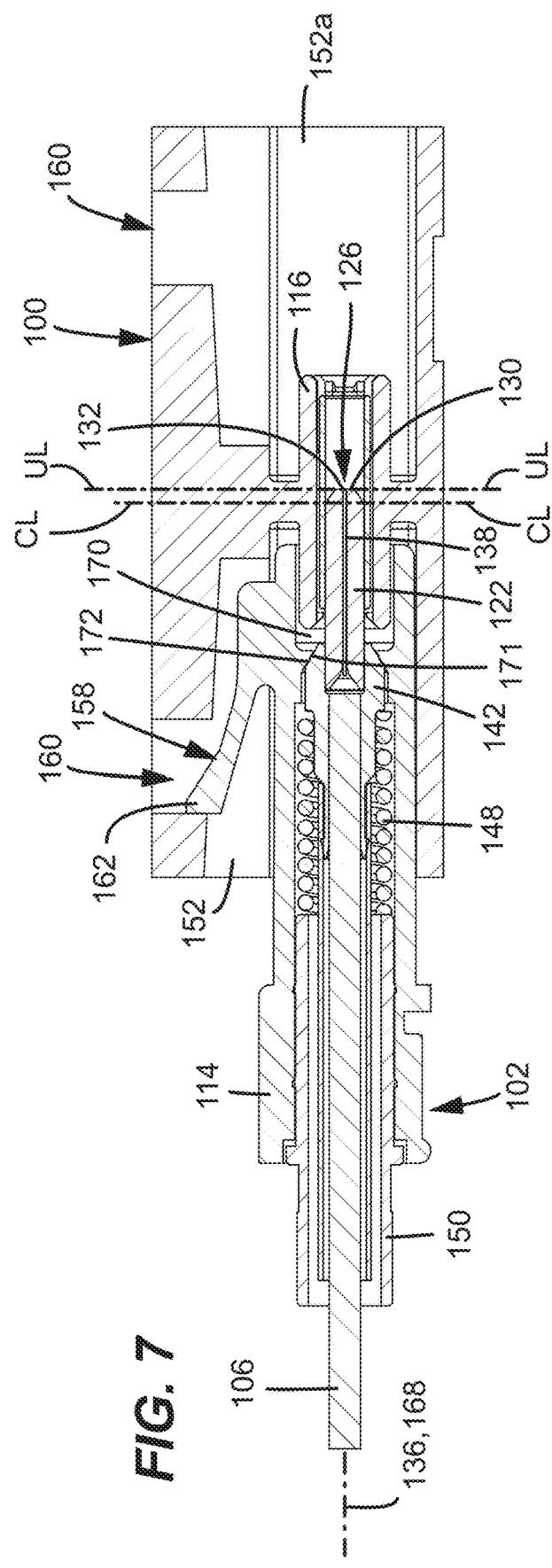
FIG. 7 illustrates a cross-sectional view taken along line 7-7 of FIG. 6.
Figure 7A:
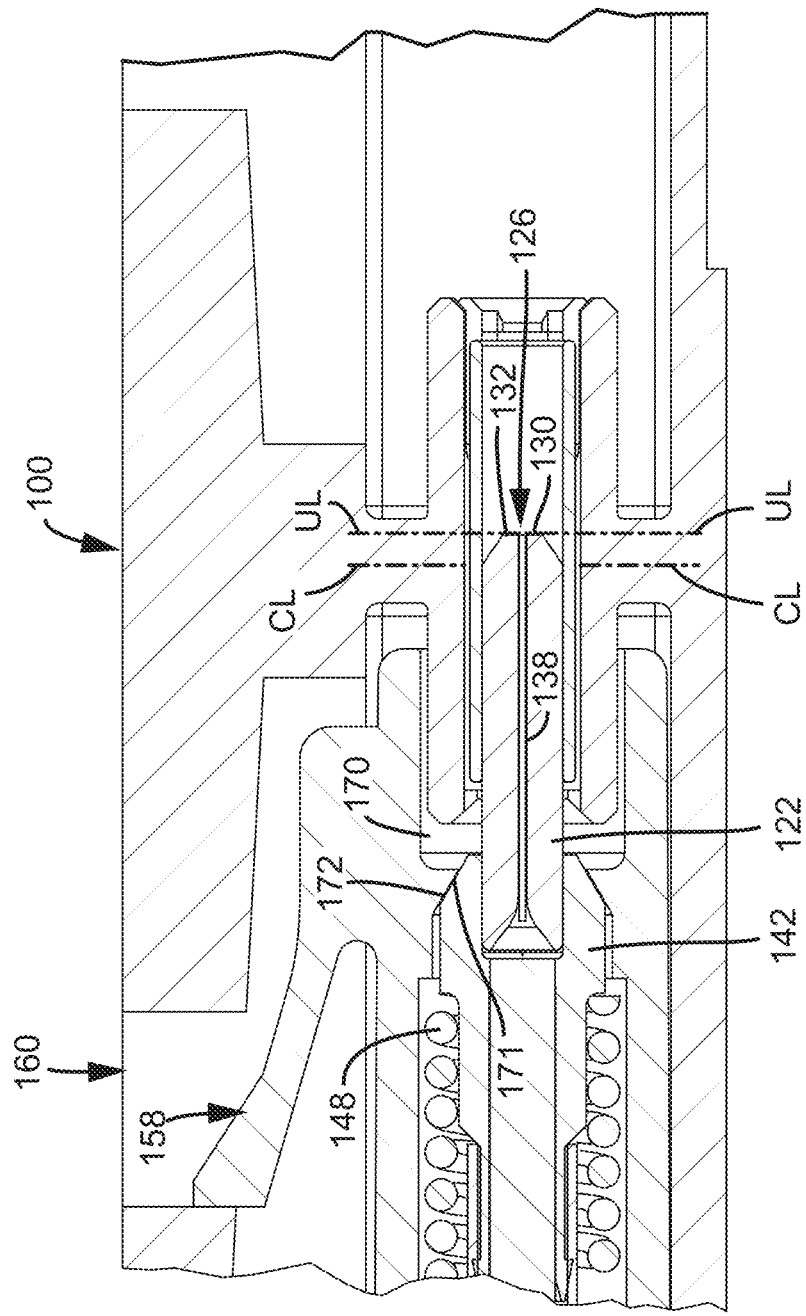
FIG. 7A illustrates an enlarged view of a portion of FIG. 7.

Turning to FIGS. 6-7, illustrate the first fiber optic connector 102 mounted within the fiber optic adapter 100 without the second fiber optic connector 104. FIG. 7A illustrates an enlarged view of a portion of FIG. 7. The connector body 114 includes an internal pocket 170 that has a front stop 172. The ferrule assembly 118 can be mounted in the internal pocket 170 of the connector body 114.

The connector body 114 has a front end 164 opposite the rear end 166. The connector body 114 defines a longitudinal axis 168 that extends through the connector body 114 in an orientation that extends from the front end 164 to the rear end 166 of the connector body 114. The central axis 134 is co-axial with the longitudinal axis 168 of the connector body 114. The connector body 114 can be disposed for limited axial movement with respect to the longitudinal axis 168 within the connector body 114.

The optical fiber 110, the ferrule 122, and the hub 142 are movable in the internal pocket 170 of the connector body 114 between a minimum extension position and a maximum extension position.

FIGS. 7 and 7A show a position of the first fiber optic connector 102 in the maximum extension position not under axial load. That is, when only one of the first and second fiber optic connectors 102, 104 is inserted into the fiber optic adapter 100 (see FIG. 7), the fibers 110, 112, the ferrules 122, 124, and the hubs 142 of the respective one of the first and second fiber optic connectors 102, 104 can be in the maximum extension position. In certain examples, when the first and second fiber optic connectors 102, 104, are inserted into the fiber optic adapter 100 and one of the first and second fiber optic connectors 102, 104 is removed or separated from the fiber optic adapter 100, the fibers 110, 112, the ferrules 122, 124, and the hubs 142 of the respective other one of the first and second fiber optic connectors 102, 104 can be in the maximum extension position.

The first fiber optic connector 102 can be mounted into the fiber optic adapter 100 such that an interface hub surface 171 of the hub 142 of the first fiber optic connector 102 engages the front stop 172. An unmated line UL can be defined when the interface hub surface 171 of the hub 142 engages a corresponding stop surface 173 of the front stop 172. As depicted, the ferrule 122 extends past or beyond the centerline CL of the fiber optic adapter 100 to the unmated line UL. The views of FIGS. 7 and 7A also show the position of the ferrule 122 and the hub 142 when the first fiber optic connector 102 is not connected to the adapter 100.

Figure 8:
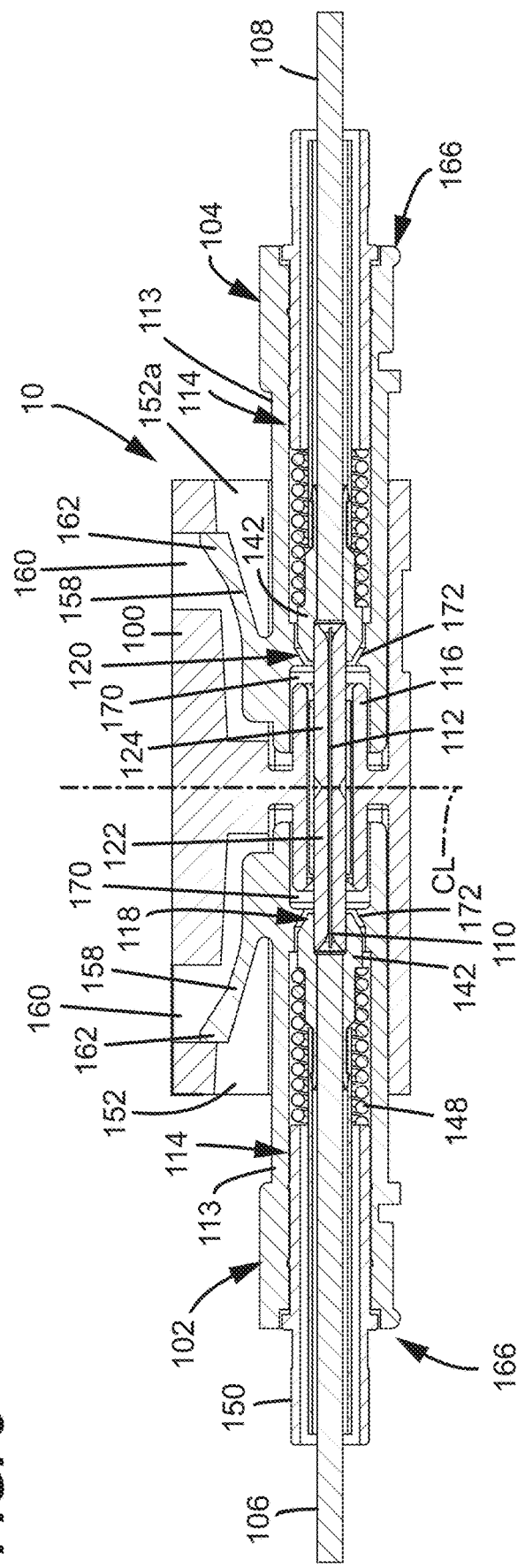
FIG. 8 illustrates a cross-sectional view of the fiber optic connector system of FIG. 1 showing the first and second fiber optic connectors a mated configuration in accordance with the principles of the present disclosure.
Figure 8A:
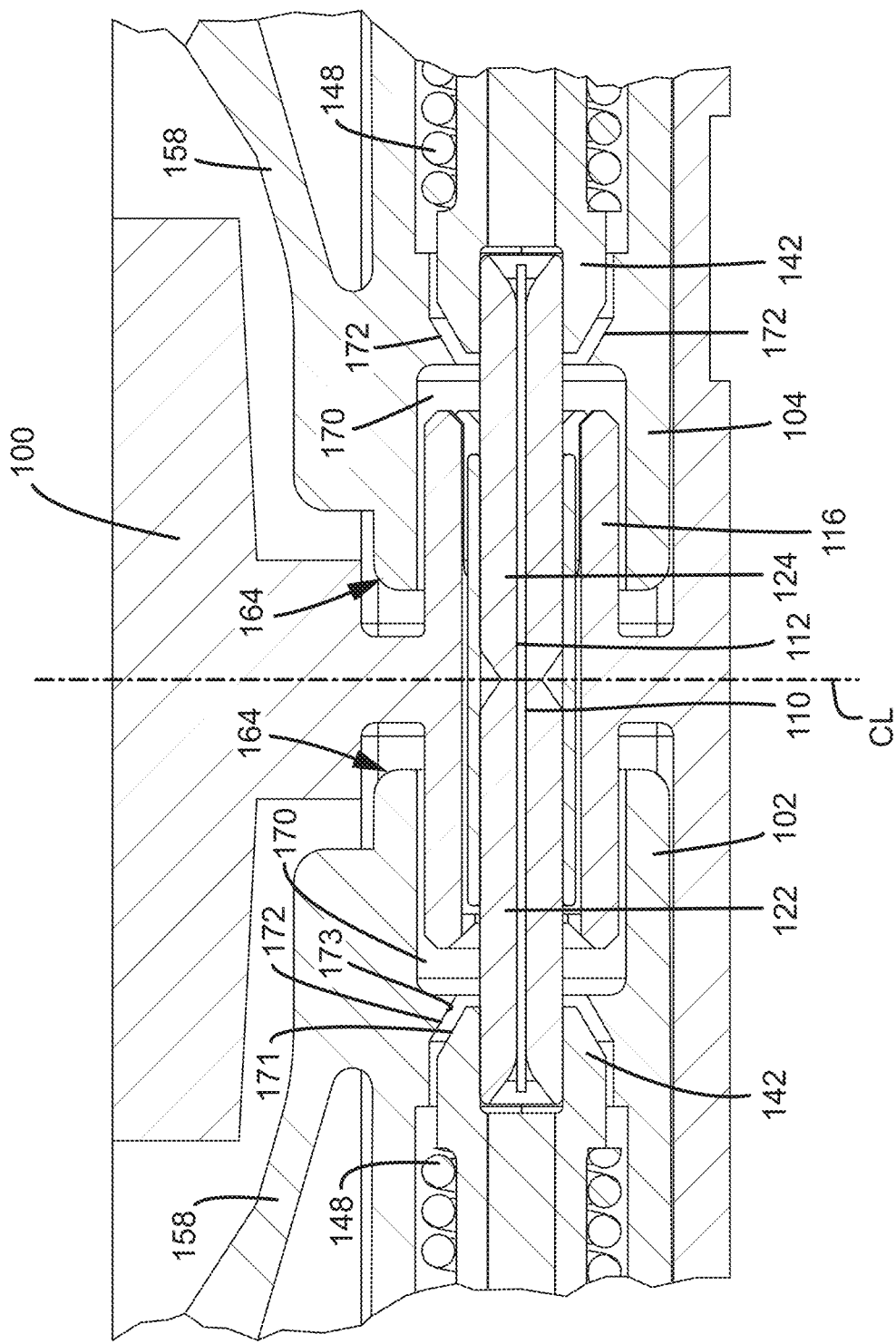
FIG. 8A illustrates an enlarged view of a portion of FIG. 8.

In FIGS. 8 and 8A, a position of the first fiber optic connector 102 is shown mated with the second fiber optic connector 104 in which there is zero load or axial pull on the cables 106, 108. When the first and second fiber optic connectors 102, 104 are held by the fiber optic adapter 100, the first and second optical fibers 110, 112, the ferrules 122, 124, and the hubs 142 are no longer in the maximum extension position.

When the first and second fiber optic connectors 102, 104 are held by the fiber optic adapter 100 and neither of the first and second fiber optic connectors 102, 104 is in the minimum extension position (i.e., under a fiber pull force, axial load), the front endfaces 130 of the ferrules 122, 124 of the first and second fiber optic connectors 102, 104 remain engaged and in contact along the centerline CL. It will be appreciated that the front endfaces 130 of the ferrules 122, 124 of the first and second fiber optic connectors 102, 104 may or may not be engaged in the middle of the fiber optic adapter 100 or at the centerline CL. A preferred location of the ferrules 122, 124 engaging is where the first and second fiber optic connectors 102, 104 are positioned within fiber optic adapter 100 under zero load or where the first and second fiber optic connectors 102, 104 are positioned such that neither one is bottomed out anywhere.

Figure 9:
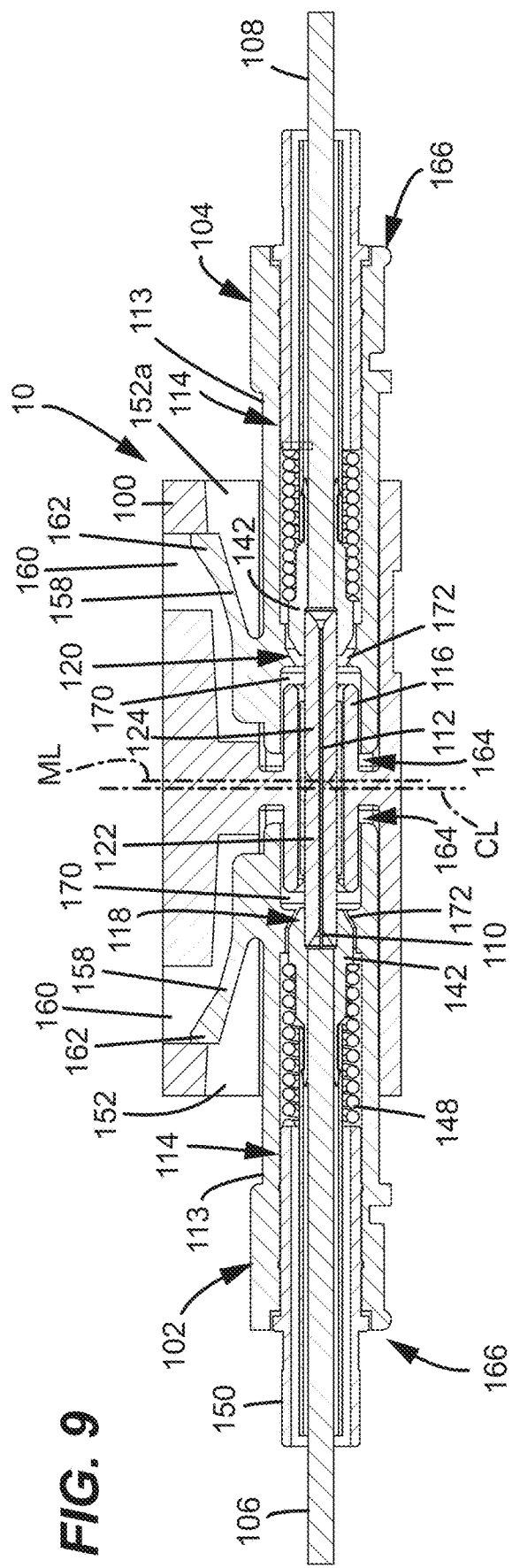
FIG. 9 illustrates a cross-sectional view of the fiber optic connector system of FIG. 1 showing the second fiber optic connector in a minimum extension in accordance with the principles of the present disclosure.
Figure 9A:
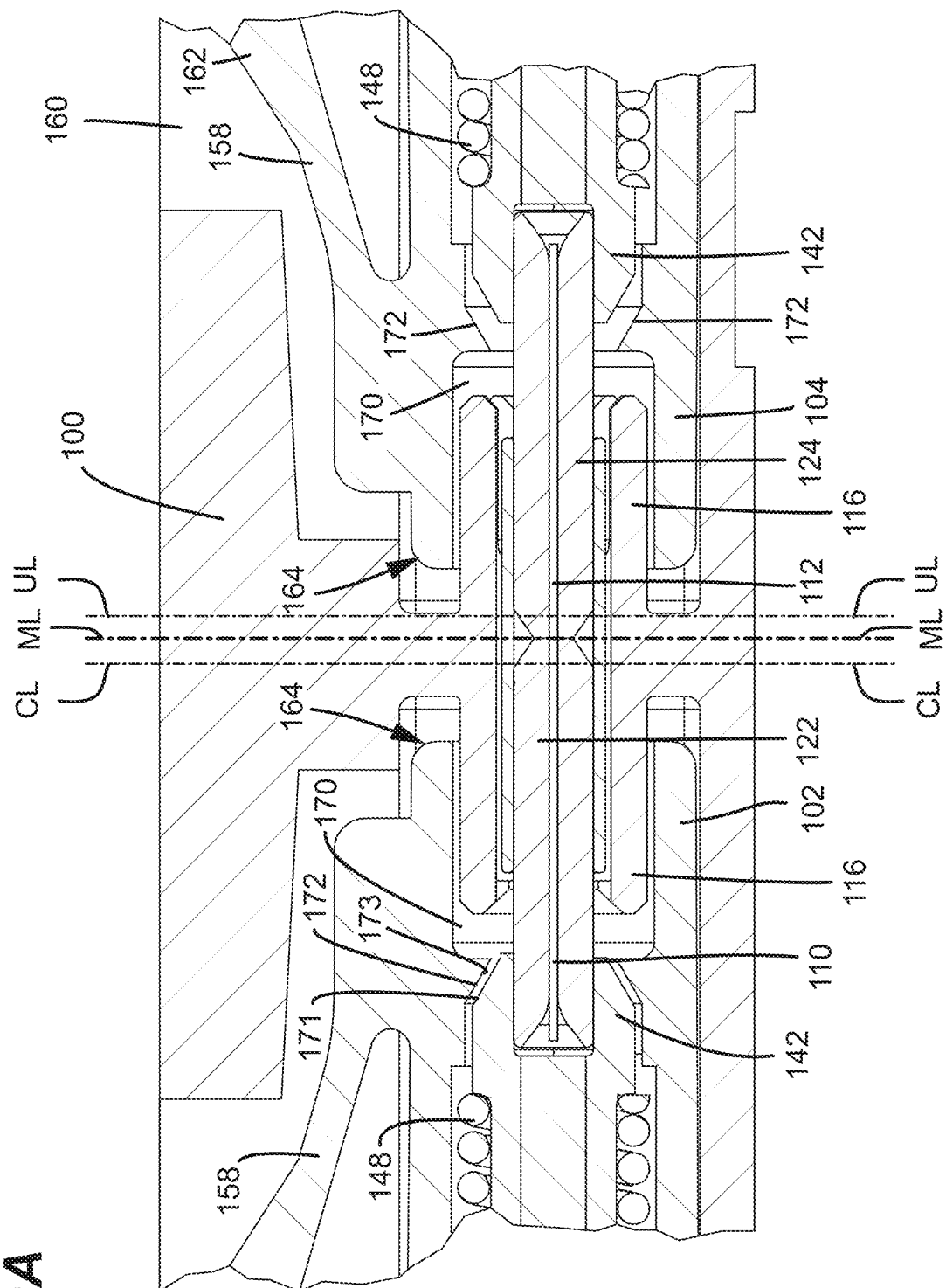
FIG. 9A illustrates an enlarged view of a portion of FIG. 9.

FIGS. 9 and 9A illustrate when an axial load is applied to the first and second fiber optic connectors 102, 104. For example, an axial load can be applied to the cable 108 of the second fiber optic connector 104 such that the ferrule 122 of the second fiber optic connector 104 is pulled back to a new position to define a mating contact line ML with the ferrule 122 of the first fiber optic connector 102. In the minimum extension position, the mating contact line ML between the front endfaces 130 of the ferrules 122, 124 has moved to the right and away from the centerline CL. The forces generated by the spring 148 bias the hub 142 toward the front end 164 of the connector bodies 114 such that the end faces of the ferrules 122, 124 remain pressed together along the mating contact line ML and the spring 148 can be solid (e.g., fully compressed). That is, adjacent coils of the spring 148 are touching such that no further compression can occur in the spring 148.

When the first and second fiber optic connectors 102, 104 are both held by the fiber optic adapter 100 and the optical fiber, ferrule, and hub 142 of one of the first and second fiber optic connectors 102, 104 is in the minimum extension position under axial load, the hub 142 of the other one of the first and second fiber optic connectors 102, 104 can move to be spaced from the front stop 172 of the internal pocket 170 of the connector body 114 of the other one of the first and second fiber optic connectors 102, 104. The front endfaces 130 of the ferrules 122, 124 of the first and second fiber optic connectors 102, 104 remain engaged and in contact with each other because the spring 148 of the second fiber optic connector 104 goes solid before the hub 142 of the first fiber optic connector 102 can engage the front stop 172 in order to prevent disconnection between the ferrules 122, 124.

For example, the ferrule 122 of the first fiber optic connector 102 follows its mating ferrule 124 of the second fiber optic connector 104 as the second fiber optic connector 104 is pulled under axial load or tensile force along the longitudinal axis 168 away from the first fiber optic connector 102. The hub 142 of the first fiber optic connector 102 stops short of engaging the front stop 172 as the spring 148 of the second fiber optic connector 104 goes solid to prevent the optical connection between the ferrules 122, 124 from disconnecting or reaching the unmated line UL. That is, the spring 148 of the second fiber optic connector can go solid before the hub 142 off the first fiber optic connector 102 bottoms out upon engagement with the front stop 172. The distance traveled by the ferrule 124 being pulled is limited by the spring 148 going solid such that the distance traveled by the mating ferrule 122 does not reach the front stop 172 of the internal pocket 170 of the first fiber optic connector 102 or the unmated line UL. The chamfered section 144 of the hub 142 can engage a corresponding chamfered surface 174 of the front stop 172.

As noted above, the optical fiber 110, the ferrule 122, and the hub 142 are movable in the internal pocket 170 of the connector body 114 between a minimum extension position (see line ML) and a maximum extension position (see line UL). The minimum extension position occurs when the cable is pulled in an axial direction away from the connector body 114 wherein the optical fiber 110, the ferrule 122, and the hub 142 are moved rearwardly relative to the connector body against the spring 148, such as might occur if the cable is accidentally caught or snagged by a technician or equipment, or by other cables pulling on the cable. Such pulling and rearward movement can occur even if the cable is secured to the connector body 114 with a crimp, and the cable is pulled. In the present example, the minimum extension position is when the spring 148 goes solid.

The maximum extension position occurs when the connector 102 is not mounted in the adapter 100, or when the connector 102 is in the adapter 100, and no second connector is present.

When the two connectors are mated, the optical fiber 110, the ferrule 122, and the hub 142 are in an intermediate position between the minimum extension position and the maximum extension position for ferrule enface contact and fiber contact for good optical signal transmission between the fiber ends. Any air gap can result in signal transmission loss or degradation.

To prevent a reduction or loss of signal transmission between two mated connectors 102, 104, the connector under a pull load is allowed to go to a minimum extension position before the other mating connector is allowed to go to the maximum extension position. This prevents ferrule front endface and fiber separation between the two connectors.

From the forgoing detailed description, it will be evident that modifications and variations can be made without departing from the spirit and scope of the disclosure.

What is claimed is:

1. A fiber optic connector system comprising:
   first and second fiber optic connectors, the first and second fiber optic connectors each including:
   a connector body having a front end, an opposite rear end, and an internal pocket including a front stop, the connector body defining a longitudinal axis that extends through the connector body in an orientation that extends from the front end to the rear end of the connector body;
   a ferrule assembly mounted in the internal pocket of the connector body, the ferrule assembly including a ferrule, a hub, and an optical fiber secured to the ferrule, the ferrule having a distal end and a proximal end, the proximal end of the ferrule being mounted to a front end of the hub and the distal end of the ferrule defining a front endface, the ferrule defining a fiber passage that is concentric with a central axis of the ferrule, wherein the central axis is co-axial with the longitudinal axis of the connector body, the fiber passage extending through the ferrule from the proximal end to the distal end; and
   a spring providing a biasing force that biases the ferrule and the hub in a forward direction along the longitudinal axis, wherein the optical fiber, the ferrule, and the hub are movable in the internal pocket of the connector body between a minimum extension position and a maximum extension position, wherein, when in the maximum extension position, the spring biases the hub toward the front end of the connector body, and the hub engages the front stop, and wherein, when in the minimum extension position, the spring is solid; and
   a fiber optic adapter having a first axial end portion defining a first adapter port for holding the first fiber optic connector and a second axial end portion defining a second adapter port for holding the second fiber optic connector in alignment with the first fiber optic connector along the central axis in a connected state;
   wherein, when the first and second fiber optic connectors are held by the fiber optic adapter such that the optical fibers, ferrules, and hubs are not in the maximum extension position, the front endfaces of the ferrules of the first and second fiber optic connectors are engaged with each other;
   wherein, when the first and second fiber optic connectors are separated from the fiber optic adapter, the optical fibers, the ferrules, and the hubs of the respective first and second fiber optic connectors are in the maximum extension position;
   wherein, when only one of the first and second fiber optic connectors is held by the fiber optic adapter, the optical fiber, the ferrule, and the hub of the one of the first and second fiber optic connectors is in the maximum extension position; and
   wherein, when the first and second fiber optic connectors are both held by the fiber optic adapter, and the optical fiber, the ferrule, and the hub of one of the first and second fiber optic connectors is in the minimum extension position under axial load, the hub of the other one of the first and second fiber optic connectors is spaced from the front stop of the internal pocket of the connector body of the other one of the first and second fiber optic connectors and the spring of the one of the first and second fiber optic connectors is solid, and the front endfaces of the ferrules of the first and second fiber optic connectors are engaged with each other;
   wherein each spring is a coil shaped spring;
   wherein when each spring is solid, coils of the spring are touching such that no further compression occurs in the spring.

2. The fiber optic connector system of claim 1, further comprising a latching arrangement for securing the first and second fiber optic connectors respectively in the first and second adapter ports of the fiber optic adapter.

3. The fiber optic connector system of claim 1, further comprising a boot, the boot having a distal end portion that is coupled to the rear end of the connector bodies, respectively.

4. The fiber optic connector system of claim 1, wherein the fiber passage at the distal end of the ferrule is configured to receive injected adhesive in order to pot the optical fiber provided in the fiber passage.

\* \* \* \* \*